Patented May 9, 1950

2,507,114

UNITED STATES PATENT OFFICE 2,507,114

ARYL AZO METHINE SULFONIC ACIDS

David Malcolm McQueen, Wilmington, Del., assignor to E. I. du Pont de Nemours & Company, Wilmington, Del., a corporation of Delaware No Drawing. Application August 21, 1946, Serial No. 692,144

4 Claims. (Cl. 260—509)

This invention relates to photographic developing agents and compositions and to their preparation and use.

Photographic developer solutions are for the most part of low stability and have, therefore, only a short working life. The active ingredients, e. g., aminophenols, substituted aminophenols, and phenylenediamines, tend to become oxidized by air to give colored products and, at the same time, the potency of the solution is diminished. The colored oxidation products are especially harmful in color development where they are deposited in one or the other of the layers and give a stained film.

An object of this invention is to provide new developing agents. A related object is to prepare new developing compositions. A further object is to provide photographic developing solutions of longer working life. A still further object is to prepare such products from commercially available raw materials. Another object is to provide improved color developers and processes of development. Still other objects will be apparent from the following description of the invention.

The novel photographic developing agents of this invention may be represented by the general formula:

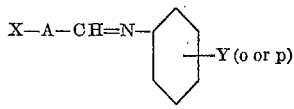

wherein A is a divalent hydrocarbon nucleus, X is a solubilizing group taken from the class consisting of —COOZ and —SO₃Z groups where Z is hydrogen or a water-soluble salt-forming cation, preferably an alkali metal, e. g., sodium and potassium, and Y is —OH, —NH₂, —NHR, or —NR₂, where R is a hydrocarbon radical. A can be an aliphatic hydrocarbon radical, e. g., methylene, or polymethylene of the formula —(CH₂)ₙ where n is 1 to 18 or more; a cycloaliphatic hydrocarbon radical, e. g., cyclohexyl, methylcyclohexyl; or an aromatic hydrocarbon radical, e. g., phenylene, naphthalene, or mixed aromatic, aliphatic hydrocarbon radical, e. g.,

The aromatic rings, moreover, may be substituted by monovalent hydrocarbon radicals, e. g., ethyl, methyl, phenyl, etc., or by various groups which do not interfere with developer action including alkoxy, or halogen.

The developing agents are new Schiff bases of amino developing agents and water-soluble ketaldones and especially aldehydes. They can be made by causing the appropriate ortho- or para-substituted anilines to react with an aldehyde containing the acidic group described above. The reaction may advantageously be carried out in an aqueous solution.

In the preferred mode of carrying out the invention an aromatic amine substituted in the ortho or para position by OH, NH₂, NHR, NR₂ (R being hydrocarbon) or an addition salt thereof, for example, p-aminodiethylaniline, is dissolved in water and a solution of an approximately equimolar quantity of an aldehyde containing an acidic group, for example, o-sulfobenzaldehyde, or its sodium salt is added at room temperature. The reaction occurs almost instantaneously and the mixture sets to a solid. This is broken up, filtered, and washed with water. The crude product is then recrystallized from a suitable solvent, such as aqueous ethanol, to give a crystalline solid, usually pale yellow in color. This material is then utilized in alkaline solution as a developing agent for photographic films, papers, slides, and the like.

The developer compositions of the invention may be made by admixing the aforedescribed developing agents with the other constituents of a developer composition including alkaline materials, e. g., sodium carbonate, potassium carbonate, sodium hydroxide, lithium hydroxide; preservatives, e. g., lithium, sodium, potassium, and ammonium sulfites and bisulfites, amine salts of sulfurous acids, for example, triethanolamine sulfite, morpholine sulfite, tetramethylammonium sulfite, trimethylbenzylammonium sulfite; restrainers, e. g., sodium, potassium, and lithium chlorides, bromides and iodides, ammonium bromide; other ingredients, e. g., emulsion hardeners, for example, potassium aluminum sulfate, chrome alum; buffering salts, e. g., disodium hydrogen phosphate, sodium metaborate, borax. The solutions or compositions may be made in two parts, if desired, which are mixed at the time of use.

The invention will be further illustrated by the following examples wherein all parts are by weight.

EXAMPLE I

To a solution of 20 parts of p-aminodiethylaniline hydrochloride in 75 parts of water, there is added a solution of 23 parts of purified sodium benzaldehyde-o-sulfonate in 75 parts of water.

The mixture turns red and a solid starts to separate. In a few minutes the entire mass becomes solid. The solid is broken up, collected on a filter and washed with water. Thirty-four parts of a yellow solid is thus obtained. This is recrystallized from about 200 parts of 75% aqueous ethanol. The small needles which separate are collected and washed with a little water to give a pale-yellow product. The structural formula is as follows:

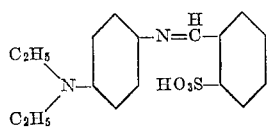

EXAMPLE II

To a solution of 26 parts of recrystallized p-aminophenol hydrochloride in 100 parts of water, there is added a solution of 46.5 parts of recrystallized sodium benzaldehyde-o-sulfonate in 100 parts of water. The mixture is shaken for a few minutes whereupon a yellow solid separates which is collected on a filter and washed with a little cold water. The solid is recrystallized from hot water to give a pale-yellow crystalline solid which has the following structure:

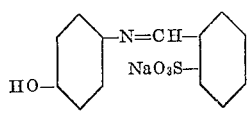

EXAMPLE III

A color developer solution is made up by admixing the following two solutions:

*Solution 1*

|  | Parts |
|---|---|
| Sodium carbonate | 7.50 |
| Sodium sulfite | 0.75 |
| Water | 75.00 |

*Solution 2*

|  | Parts |
|---|---|
| Product of Example I | 1.50 |
| Water | 300.00 |

Solution 2 is added to Solution 1 with stirring. When an exposed multilayer color film containing suitable color formers in the respective silver halide emulsion is developed in this solution, bleached, fixed, and washed, a colored image of good clarity and brilliance is obtained. The stain in the highlights is considerably less than that obtained when the film is developed in ordinary color developer where p-aminodiethylaniline hydrochloride is substituted for the product of Example I on an equimolar basis in the above formulation.

EXAMPLE IV

A color-developing solution is prepared as above and to 100 parts thereof 0.2 part of acetoacetanilide dissolved in ten parts of acetone is added. An exposed photographic silver halide emulsion film is developed in this solution, washed, bleached, and fixed to a brilliant yellow dye image containing no stain.

1-phenyl-3-methyl-5-pyrazolone gives magenta images and 1-hydroxy-2-naphthanilide gives blue-green images when substituted in similar amounts for the acetoacetanilide of this example.

When the developer solution containing the Schiff base is allowed to stand at room temperature in a partly filled bottle for a week, the solution does not darken. However, ordinary color developer stored under the same conditions contains a large amount of colored oxidation products.

EXAMPLE V

A black and white developer solution of the following composition:

|  | Parts |
|---|---|
| Water | 50.0 |
| Sodium sulfite | 4.5 |
| Sodium carbonate | 7.0 |
| Potassium bromide | 0.5 |
| Product of Example II | 4.5 |
| Water | 345.0 | is made by dissolving the solid materials in the order given in the water and adding the remainder of the water. Exposed photographic paper is developed in this solution and then fixed and washed in the conventional manner to give silver images of good contrast and clarity.

When this developer solution is stored in a partly filled bottle at room temperature it does not darken or lose its potency for a week. However, a similar solution containing p-aminophenol hydrochloride instead of the developer compound of Example II, darkens in less than a day.

EXAMPLE VI

To a solution of 25 parts of p-aminophenol in 100 parts of warm ethanol there was added a solution of 30 parts of phthalaldehydic acid in 100 parts of ethanol. After the solution was mixed thoroughly it was set aside for a day. The crystals which formed were collected, washed with ethanol, and dried. The yield was 20 parts of nearly white solid which was recrystallized from ethanol. The melting point was 180° C. Analysis calculated for $C_{14}H_{11}NO_3$: N=5.8%; found: N=5.8%. This corresponds to the following structural formula:

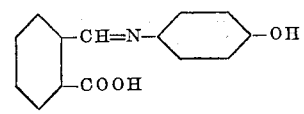

EXAMPLE VII

A developer solution is prepared by admixing the constituents as follows:

|  | Parts |
|---|---|
| Water | 250.0 |
| Sodium sulfite | 8.0 |
| Sodium carbonate | 7.0 |
| Product of Example VI | 2.4 |

An exposed photographic film containing a latent silver halide is developed in said solution for five minutes. The film is then fixed, washed, and dried to give an image of good clarity and contrast.

EXAMPLE VIII

A developer solution is prepared by admixing the following two solutions made by dissolving the constituents in water:

*Solution A*

| | | |
|---|---|---|
| Sodium carbonate | grams | 20 |
| Sodium sulfite | do | 2 |
| Water | ml | 500 |

*Solution B*

[structure: C6H4(SO3H)–CH=N–C6H4–OH] ............grams 3.3

Water ............................................ml 450

An exposed photographic film containing a latent silver halide image when developed in said solution gives results like those of Example VII.

EXAMPLE IX

A developer solution is prepared by admixing the following two solutions made by dissolving the constituents in water:

*Solution A*

| | | |
|---|---|---|
| Sodium carbonate | grams | 25.0 |
| Sodium sulfite | do | 10.0 |
| Potassium bromide | do | 2.0 |
| Water | ml | 500.0 |

*Solution B*

⌬—CH=N—⌬—N(C$_2$H$_5$)(C$_2$H$_5$)  grams ___ 3.5
 |
 SO$_3$Na

Water _____ ml __ 400.0

An exposed photographic film containing a latent silver halide image when developed in said solution gives results like those of Example VII.

EXAMPLE X

A developer solution is prepared by admixing the following two solutions made by dissolving the constituents in water:

*Solution A*

| | | |
|---|---|---|
| Sodium carbonate | grams | 25 |
| Sodium sulfite | do | 30 |
| Water | ml | 500 |

*Solution B*

⌬—CH=N—⌬—OH _____ grams __ 9
 |
 COOH

Water _____ ml __ 400

An exposed photographic film containing a latent silver halide image when developed in said solution gives results like those of Example VII.

In place of water and alcohol, other solvents for the reaction between the aromatic amine and the aldehyde may be used. Suitable additional solvents include acetone, benzene, diethyl ether, chloroform, ethyl acetate, and dioxane.

In place of the specific o- and p-substituted aromatic amines mentioned, there may be used other aminophenols, for example, o-aminophenol, 4-hydroxy-m-toluidine, 2,6-di-iodo-4-aminophenol, 2-amino-4-sulfophenol, 3-sulfo-4-aminophenol, 3-chloro-4-aminophenol and 3,4-di-aminophenol. There may be used other derivatives of p-phenylenediamine, such as N,N-dimethyl-p-phenylenediamine, N-methyl-p-phenylenediamine, N,N-bis-beta-hydroxyethyl-p-phenylenediamine, N-octadecyl-p-phenylenediamine, N,N-diethyl-2-methyl-p-phenylenediamine. Other aromatic amines which are useful include aminotetrahydroquinoline and p-aminophenylmorpholine. These compounds all have the property of acting as photographic developing agents. Reaction with the acidic aldehydes leads to improved developing agents but this reaction will not give developing properties to a Schiff base derived from an aromatic amine which does not in itself have developing powers.

In place of the acidic aldehydes mentioned in the examples, there may be used various other aldehyde compounds of this type. Suitable other compounds include m- or p-sulfobenzaldehyde, 3-chlorophthalaldehydic acid, the half aldehyde of adipic acid, and their sodium or potassium salts. Among the ketones containing an acid group which may be used in place of the acidic aldehydes are levulinic acid and alpha-ketopimelic acid. Because of the higher solubility and greater stability of the new developing agents, it is possible in many cases to use less customary alkaline reacting materials, e. g., barium hydroxide, sodium aluminate, quaternary ammonium hydroxides and amines. Usual additives, such as sodium sulfite, sodium thiocyanate, paraformaldehyde, neutral salts and water-miscible organic solvents can also be employed with the novel agents although these are not necessary.

The proportions of the constituents of the developer compositions of this invention can be varied. Practical amounts are set forth in the following table:

| | Grams |
|---|---|
| Alkaline salt | 5 to 100 |
| Alkali metal sulfite | 0 to 25 |
| Alkali metal bromide | 0 to 10 |
| Schiff's base | 1 to 10 |

The Schiff's base referred to in the table are the products comprehended by the general formula above.

A further advantage of the novel Schiff bases of this invention which have developing properties mentioned above, is their improved water solubility. Certain developers, such as p-amino-N,N-dibutylaniline and 4-amino-2-ethyl-N,N-diethylaniline, have limited solubility in water and cannot be used in spite of their lower toxicity and the occasional superiority of their color-developed dye derivatives. However, the Schiff bases are easily soluble in dilute sodium carbonate and thus the number of possible useful developers is greatly increased. The same holds true for certain black and white developers. The Schiff base of p-aminophenol is more soluble in dilute sodium carbonate than p-aminophenol itself.

The long-chain substituted Schiff bases which contain an alkyl chain of 12 to 18 carbon atoms, e. g., N-octadecyl-p-phenylenediamine are useful as non-migratory developers and can be incorporated into the colloid layers of a single or multilayer light-sensitive film. When the exposed film is treated with alkali, e. g., sodium carbonate, sodium hydroxide, etc., the development takes place.

As many apparently widely different embodiments of this invention may be made without departing from the spirit and scope thereof, it is to be understood that the invention is not limited to the specific embodiments thereof except as defined in the appended claims.

What is claimed is:

1. A chemical compound of the formula

X—A—CH=N—⌬—Y wherein A is a divalent hydrocarbon nucleus, X is a solubilizing group taken from the class consisting of —COOZ and —SO$_3$Z, where Z is a member taken from the class consisting of hydrogen and a water-soluble salt-forming cation and Y is in one of the positions ortho and para to the nitrogen atom and is taken from the group consisting of —OH, —NH$_2$, —NHR, and —NR$_2$, where R is a hydrocarbon radical.

2. A chemical compound of the formula

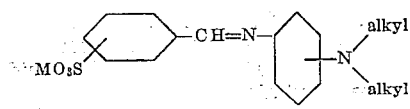

where M is an alkali metal and the dialkylamino radical is in one of the positions ortho and para to the nitrogen atom.

3. A chemical compound of the formula

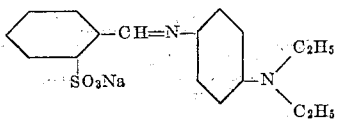

4. A chemical compound of the formula

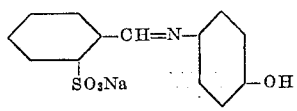

DAVID MALCOLM McQUEEN.

REFERENCES CITED

The following references are of record in the file of this patent:

UNITED STATES PATENTS

| Number | Name | Date |
|---|---|---|
| 2,048,006 | Hutton | July 21, 1936 |
| 2,091,743 | Straub | Aug. 31, 1937 |
| 2,139,471 | Schmidt | Dec. 6, 1938 |
| 2,181,122 | Downing | Nov. 28, 1939 |
| 2,262,544 | Despois | Nov. 11, 1941 |
| 2,278,163 | De Groote | Mar. 31, 1942 |
| 2,319,078 | McNally | May 11, 1943 |
| 2,358,893 | Vincent | Sept. 26, 1944 |
| 2,376,911 | Graenacher | May 29, 1945 |
| 2,397,676 | Lyon | Apr. 2, 1946 |
| 2,414,491 | Tulagin | Jan. 21, 1947 |
| 2,426,894 | McQueen | Sept. 2, 1947 |

FOREIGN PATENTS

| Number | Country | Date |
|---|---|---|
| 76,415 | Germany | 1894 |

OTHER REFERENCES

Beilstein, 14, 705 (DRP 99,542).